Patented June 11, 1940

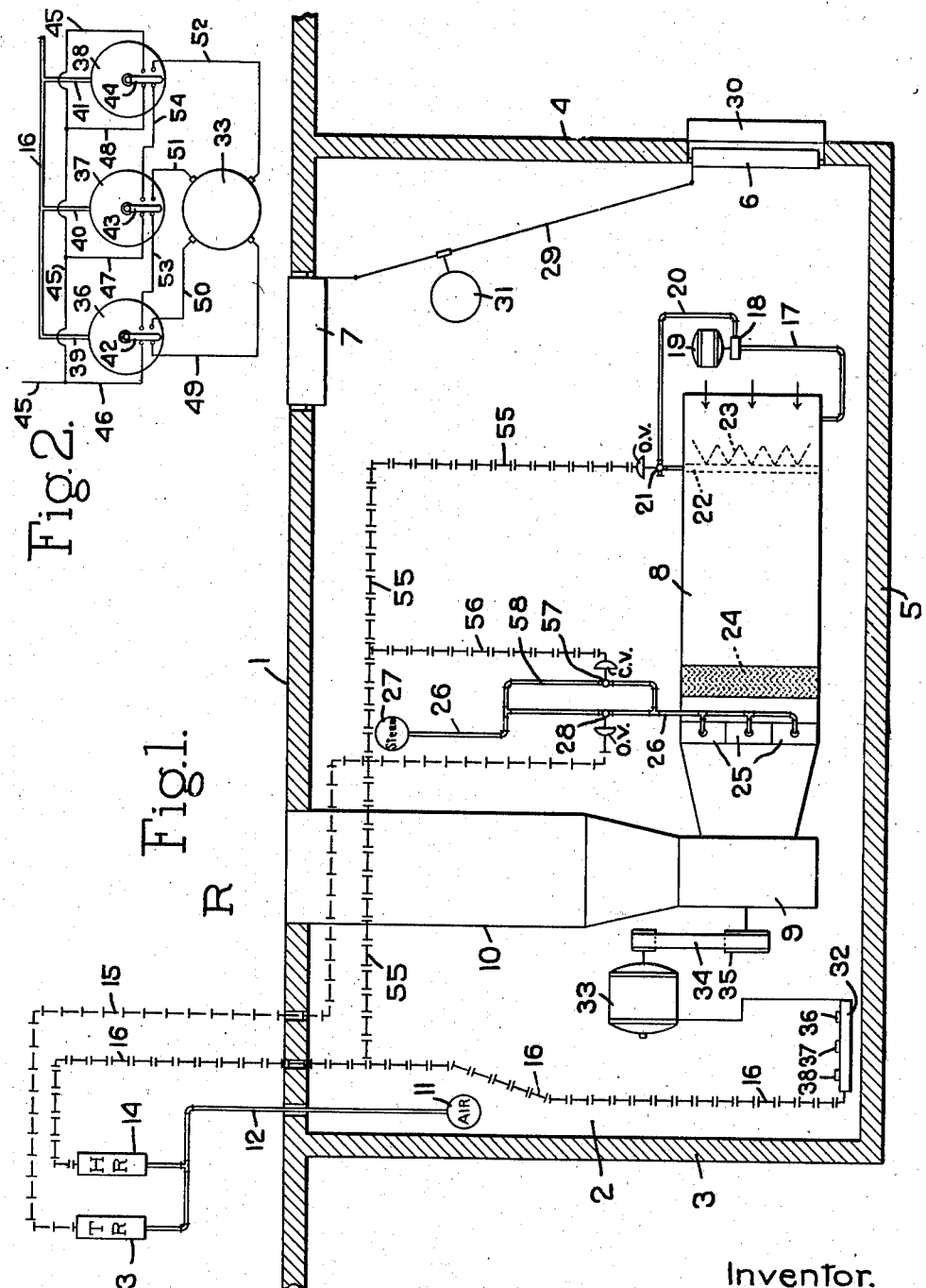

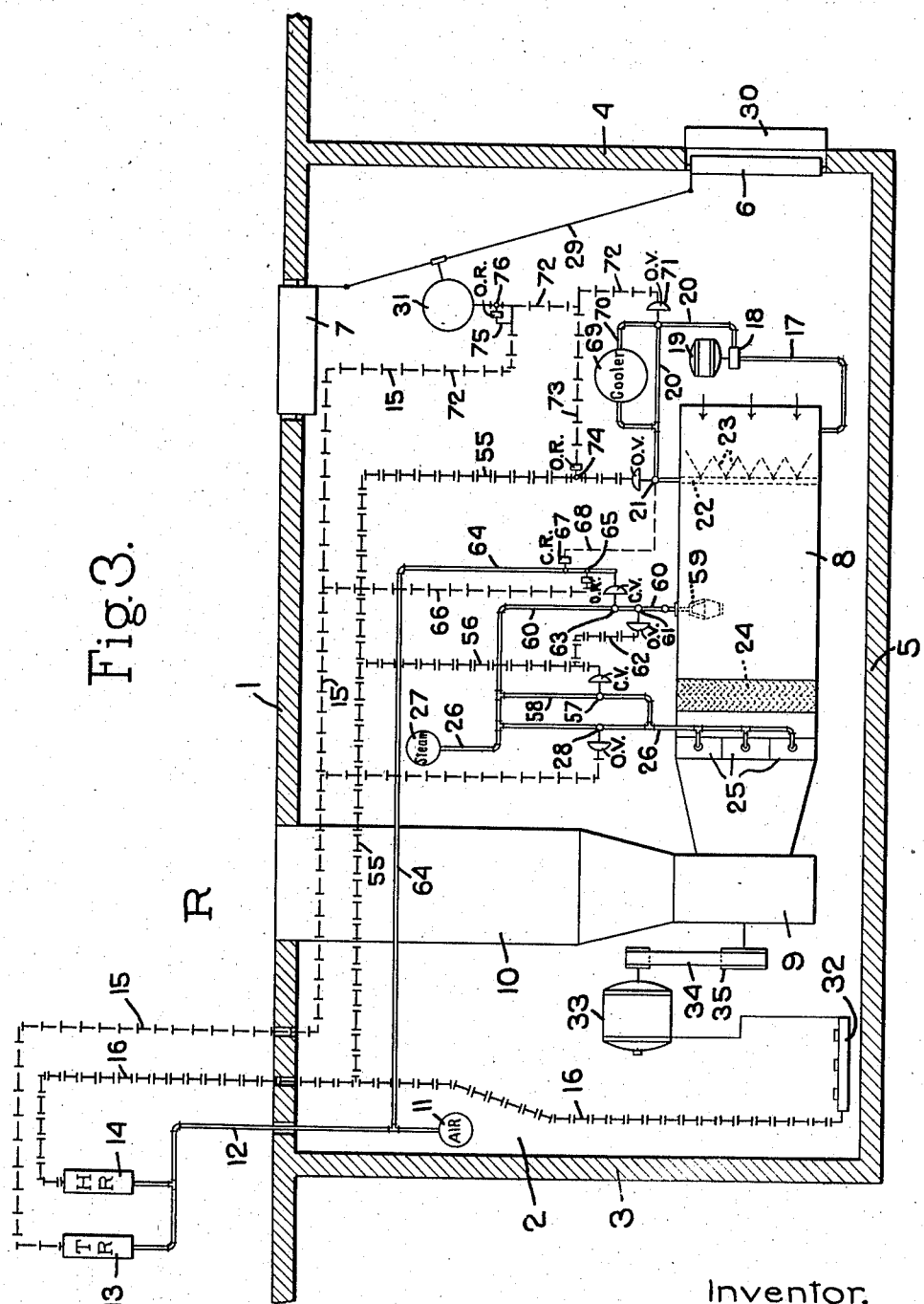

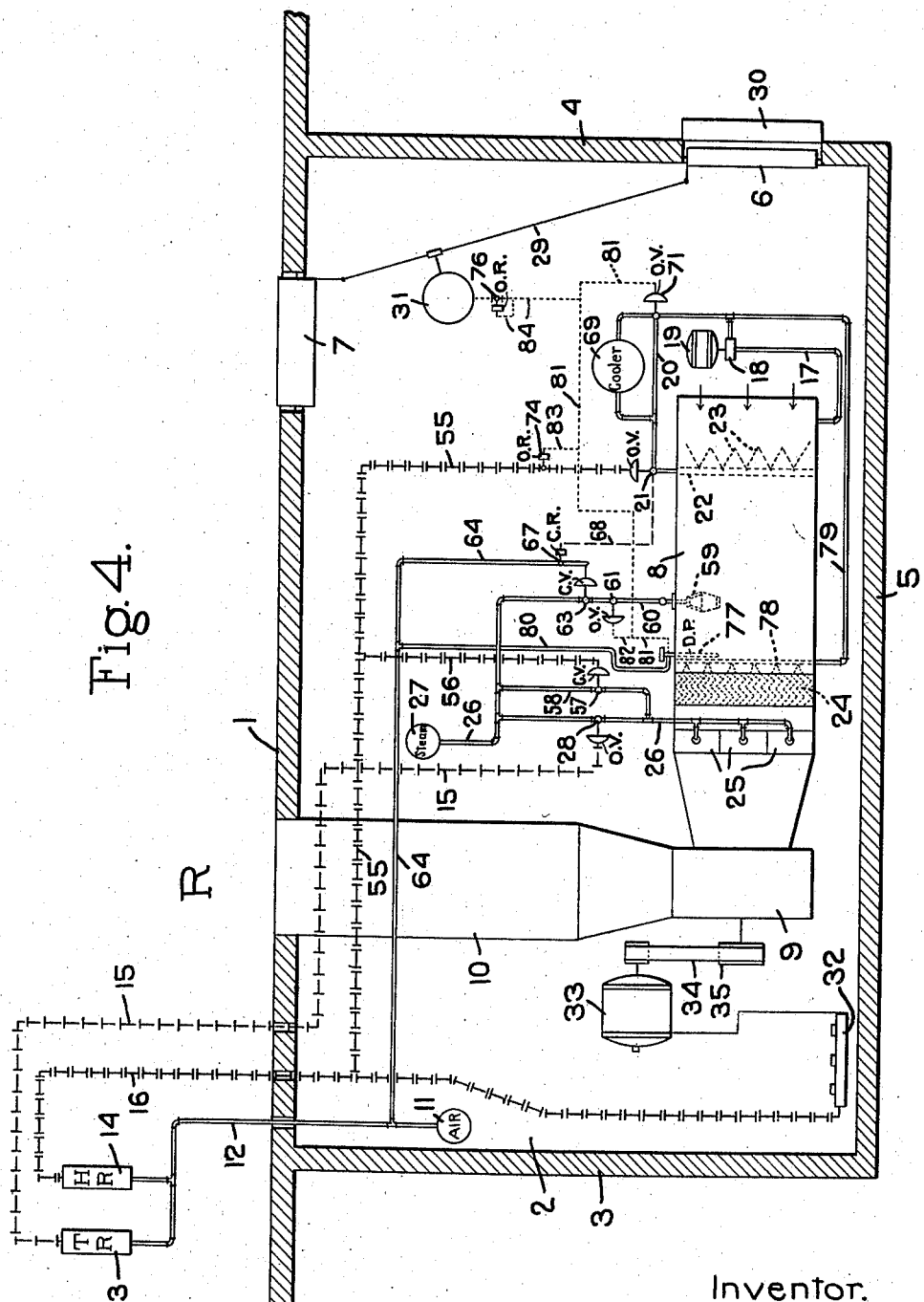

2,204,016

UNITED STATES PATENT OFFICE 2,204,016

VENTILATING AND HUMIDIFYING SYSTEM

Alfred F. Karlson, North Leominster, Mass., assignor to Parks-Cramer Company, Fitchburg, Mass., a corporation of Massachusetts Application June 25, 1937, Serial No. 150,296

18 Claims. (Cl. 236—44)

This invention relates to improvements in methods and apparatus for ventilating and conditioning the air of a room to maintain the air of the room at a predetermined standard of temperature and humidity.

In air conditioning apparatus hitherto used for such purposes, it has been the usual practice to utilize air-impelling means such as fans to circulate a supply of conditioned air for the room and to regulate the atmospheric conditions within the room by different methods, such as: Varying the condition of the air supplied to the room by varying the amount of heat or moisture supplied thereto; variably diluting the supply of conditioned air with air returned from the room; and varying the volume of the conditioned air supplied to the room by variably restricting the rate of delivery thereof by means of adjustable dampers.

The general object of my invention is to provide a variable supply of energy available solely to effect the unobstructed circulation of a supply of conditioned air for a room and to controllably vary the circulation of said conditioned air in accordance with room conditions by varying the energy supplied and actually employed to effect circulation responsive to room conditions, thereby to maintain the desired room conditions at all times with the minimum consumption of power consistent with variations in outside weather conditions or other factors affecting the room conditions regardless of the duration or extent of such variations.

It is a special object of my invention to maintain an unobstructed circulation of conditioned air and to regulate only the energy employed in maintaining said circulation responsive to room humidity, thereby to limit said circulation and the energy employed in maintaining the same at all times to that minimum required to maintain the room humidity at a predetermined standard.

The novel and distinguishing characteristics of my invention are the method and means employed to accomplish controllably variable and unobstructed circulation of conditioned air in volume correlated to the air conditions within the room by variably limiting, responsive to room conditions, the energy employed in maintaining circulation to the minimum effective to maintain room humidity at a predetermined standard.

The term "Predetermined standard of room conditions" as used herein denotes a predetermined condition or permissible range of relative humidity, coupled with a predetermined condition or permissible range of room temperature and is expressly defined to include a corresponding standard or permissible range in the values of the dew point and the heat content of the room air.

For example, in the case of a predetermined room condition defined as a relative humidity of from 58 to 62% and a temperature of from 75 to 80 degrees F., the upper and lower permissible limits of room conditions corresponding to the predetermined standard would be respectively:

|  | Humidity | Temperature | Dew point | Heat content |
|---|---|---|---|---|
|  | Percent | Degrees | Degrees |  |
| Maxima | 62 | 80 | 65.8 | 36.06 |
| Minima | 58 | 75 | 59.2 | 29.89 |

The term "Heat content," as herein used, denotes the sum of the heat required to raise the dry air present in one pound of room air from 0° F. to its actual temperature and the latent heat of the vapor present in said pound of room air stated in B. t. u. per pound.

When internal heat liberation or increasing warmth of weather has raised the atmospheric conditions in the room to the maximum limit of the predetermined standard, any further rise in humidity or temperature necessarily causes the dew point and the heat content of the room air to rise and establishes the presence of undesirable heat in the room air which is defined herein as "a surplus of heat content in the room air."

So long as room conditions remain within the limits of the predetermined standard, the method of my invention provides for the conservation of useful heat by maintaining ventilation at a preferred minimum and when such a surplus of heat content in the room air has become established, it may be most economically rejected in accordance with the method of my invention by increased ventilation which is effected by increasing the relative proportion of fresh air in a controllable mixture of fresh and return air "in correlation to the heat content of the room air," that is to say, "by correlating the relative proportions of said fresh and return air to the heat content of the room air."

Any such change in the heat content of the room air from a value within the predetermined standard of room conditions to a value exceeding said predetermined standard of room conditions is reflected by a rise in the room temperature. Also such rise in the room temperature is reflected by a rise in the dew point of the conditioned air supplied to the room, and my method provides for utilizing either of the above indications of the presence of surplus heat in the room air to correlate the degree of ventilation to the heat content of the room air.

Such rise in heat content of the room air may be due either to an increase in the liberation of heat within the room, or to increasingly warm or humid outside weather, but in either case it is obvious that such rise in heat content is accompanied by a rise in room temperature and a rise in the dew point of the humidified air supplied to the room. Also when no further increase in the degree of ventilation is possible for checking the rise in heat content, my method provides for recourse to refrigerative cooling of the conditioned air supply by correlating the degree of refrigeration to the heat content of the room air.

My method broadly stated comprises ventilating and humidifying the air of a room by employing energy to circulate a continuous supply of air properly conditioned by the natural evaporation of water therein for the purpose of renewing the room air and regulating the volume of the air supplied to the room by varying only the energy employed in circulating the air in response to variations of the conditions of the room air, thereby to maintain a predetermined standard of humidity within the room.

More specifically my invention comprises the method of conditioning the air of a room to a predetermined standard of temperature and humidity by employing energy to circulate a continuous supply of air composed of a mixture of air withdrawn from the room for recirculation, and fresh air for ventilation, moistening the mixture by natural evaporation of water spray therein, and controlling the rate at which said mixture is supplied to the room by limiting the energy employed for circulation to the minimum rate required to supply said humidified mixture of air in such volume as will maintain a predetermined standard of humidity, thereby reducing the cost of the energy employed and eliminating that waste of energy which is inherent in air conditioning systems of the type described in which humidity is controlled by other methods.

Inasmuch as the atmospheric condition of the air, particularly the fresh air, is subject to frequent and often wide variations both as to heat and humidity, other steps in the present method include controllably heating the air supply only in response to deficient room temperature, rejecting surplus heat when present in the room air by regulating the proportion of fresh air present in the mixture in correlation to variations in the heat content of the room air, and when necessary artificially cooling or de-humidifying the mixture of fresh and recirculated room air in response to excessive heat content of the room air.

The method also includes controlling the heat content of the room air in accordance with the predetermined standard in correlation to either the dew point of the conditioned air or the room temperature.

Briefly to summarize, my novel method comprises employing at all times the minimum of energy required to maintain room conditions by (1) limiting the degree of ventilation to the minimum required to conserve useful heat when present in the room air and resorting to the use of artificial heat only responsive to a deficiency of heat in the room air; (2) maintaining only sufficient ventilation to reject surplus heat when present in the room air and resorting to refrigeration only when excessive heat in the outside air prevents rejection of surplus heat by further increase in the degree of ventilation, and (3) limiting the circulation of conditioned air and the energy consumed thereby at all times to the minimum required to maintain a predetermined standard of room conditions.

The various operations necessary for the application of the method of my invention may be performed manually if desired in accordance with variations in room conditions as indicated and observed, but such operations in the interest of efficiency and economy are preferably controlled by suitable automatic regulating means.

A preferred apparatus for performing the method herein disclosed is shown in the accompanying drawings, in which, Fig. 1 is a diagrammatic illustration of a simple form of apparatus for conditioning the air of a room to provide a predetermined standard of humidity and a minimum temperature in accordance with the present invention;

Fig. 2 is a diagrammatic view of a preferred form of apparatus for controlling the energy required to maintain continuous circulation of the air of the room;

Fig. 3 is a diagrammatic illustration of an apparatus for conditioning the air of a room to provide a predetermined standard of humidity and temperature responsive to controlling means actuated by variations in atmospheric conditions within the room proper;

Fig. 4 is a diagrammatic illustration of an apparatus for conditioning the air of a room to provide a predetermined standard of humidity and temperature responsive in part to the actuations of regulating means located in the room and in particular to the actuations of thermostatic means sensitive to the dew point of the conditioned air supplied to the room.

A simple form of air conditioning apparatus embodying my invention and adapted to perform the method herein disclosed is illustrated in the accompanying drawings for conditioning a room R of any desirable size, only one of the walls 1 of which is illustrated. The room R may be of a usual type such as a room of a textile mill having windows and if desired suitable ventilators to permit controlled egress of the air of the room, as is usual in building constructions. The conditioning apparatus proper is housed in an adjacent room 2 of which the wall 1 is common with the wall of the room R and which has end walls 3 and 4 and a side wall 5 equipped with suitable windows and doors (not shown). One of the walls, preferably the wall 4, is provided with an opening the effective area of which is controlled by dampers 6 to admit fresh air to the room, and the wall 1 is likewise provided with an opening controlled by dampers 7 to admit air from the room R into the room 2 for recirculation. The air entering the room 2 is drawn through a suitable humidifier 8 hereinafter more fully disclosed, by a fan 9 which forces the humidified air through a suitable duct 10 into the room R. By reason of this arrangement, fresh air drawn from the outside, or air drawn from the room R, or a mixture of fresh air and air withdrawn from the room R, may be selectively proportioned and in passing through the humidifier moistened by natural evaporation of water and thereupon delivered by the fan under pressure to the room for the purpose of renewing the air of the room and continuously circulating it therein, and means are provided for regulating the volume of the air supplied to the room by varying only the energy employed in circulation of the air by the fan in response to room conditions to regulate the humidity of the room, as will hereinafter more fully appear.

In the illustrative apparatus shown in the drawings regulating devices, which are responsive respectively to variations in temperature and humidity, are located within the room, and are respectively designated as TR, (temperature regulator) and HR (humidity regulator), and are adapted to control relay valves in a pneumatic system having means respectively for controlling the water spray of the humidifier and the heating of the humidified air within the humidifier and the speed and consequently the volume of air which is delivered to the room.

The pneumatic controlling system illustrated herein comprises a source of air under pressure, such as a compressor 11 from which air under pressure is transmitted through a pipe 12 to the temperature regulator 13 and also to the humidity regulator 14.

In order to facilitate the reading of the drawings the main pipe 15 for air under pressure leading from the temperature regulator to the valve operated thereby is illustrated by a series of T's, while the main pipe 16 leading from the humidity regulator to other valves or regulating mechanism are illustrated as a series of H's.

In order further to facilitate the reading of the drawings normally open regulating valves of the pneumatic system are marked OV and normally closed regulating valves are marked CV.

The general construction of the apparatus which is common to Figs. 1, 2, and 3 of the drawings may be briefly described as comprising a fan 9 having its intake connected to the humidifier 8 in which the air supply introduced by the fan is first moistened by natural evaporation of spray water within the humidifier, then relieved of unevaporated moisture by passage through a suitable eliminator, thereafter heated if necessary by an air heater preferably between the eliminator and the fan and delivered through the duct 10 into the room R.

The humidifier 8 may be of a usual type having in its base a tank (not shown) to which water is supplied from a suitable source and maintained at a substantially constant level in the tank by a suitable float valve which controls the water supply. In order to provide a spray within the humidifier water is drawn from the tank through a pipe 17 to a suitable pump 18 preferably driven by an electric motor 19 and is delivered from the pump under pressure through a pipe 20 through a normally open diaphragm valve 21 to a pipe 22 extending transversely of the humidifier and provided with means for projecting jets of spray 23 across the path of the air which is drawn through the humidifier by the fan 9, as is illustrated by arrows at the intake end of the humidifier.

Electric current may be supplied to the motor 19 through usual connections including switches (not shown).

The air thus moistened by the spray is then drawn through a suitable eliminator 24, preferably comprising vertically arranged parallel zigzag plates which serve to remove and return to the tank liquid particles carried in the air stream. The current of humidified air then passes through an air heating chamber or apparatus 25 which comprises radiators supplied with steam through a pipe 26 from a suitable source 27. The supply of steam to the pipe 26 normally passes through the open pneumatic valve 28 which is under the control of the temperature regulator, but alternatively may pass through a normally closed valve in the by-pass which is controlled by the humidity regulator under conditions which will hereinafter be described. The dampers 6 and 7, which control respectively the admission of fresh and return room air to the humidifiers, are preferably connected for compensating or differential operation through a suitable linkage 29 in an arrangement such that one damper opens as the other closes, thereby to provide a mixture of fresh air and recirculated air of controllable proportions to constitute the supply of air available at the inlet of the humidifier for subsequent conditioning. In order to prevent the entry of snow or rain the opening through which fresh air enters the room 2 is provided with a series of outwardly extending and downwardly inclined louvers 30.

The mechanism 29 connecting the dampers 6 and 7 may be manually controlled, or if desired may be actuated through a damper motor 31 under automatic control as hereinafter described.

The thermostatic regulator 13 (TR), which may be a thermostat, is subject to the atmospheric condition of the room, and is operatively connected with the normally open valve 28 to actuate the same through the air pipe line 15 in such manner that a fall in room temperature below the actuating setting of the thermostat will cause progressive opening of the valve 28 in response to falling actuating pressure, thereby permitting the admission of steam from the source 27 to the heater 25, until a rise in room temperature to the thermostat setting causes the closure of the valve 28.

The humidity regulator 14 (HR), which may be a humidostat or psychrostat, is likewise subject to the atmospheric conditions of the room, and is operatively connected through the air pipe line 16 for actuation of selector switches upon a panel 32 which controls the speed of a motor 33 for driving a fan and which as illustrated drives the fan 9. As illustrated herein the motor shaft is provided with a pulley which drives a belt 34 which actuates a complementary pulley 35 on the shaft of the fan 9.

A desirable form of selector switch mechanism for the panel 32 is illustrated in Fig. 2 and comprises three switches 36, 37, and 38, operated by pressure supplied through the air pipe 16. The respective switches 36, 37 and 38 are provided with diaphragm mechanism of different resistance progressively responsive to increasing air pressure supplied by the pipe 16 through the branch pipes 39, 40 and 41. The actuating switches are shown in their normal position with their respective blades 42, 43, and 44 in contact with their respective normal contact points. When subjected to progressive rise in actuating pressure responsive to increasing humidity, the switches are operable to be successively reversed in the order named, thereby to make respective contact between the blades 42, 43, and 44, and the reverse contact points. The main circuit 45 for the motivating current is provided with branch circuits 46, 47, and 48, which are connected through corresponding leads 49, 50, 51 and 52 to corresponding windings of the fan motor 32 in the following manner:

(1) Through the branch circuit 46 to one of the normal contact points of the blade 42, thence to the other contact point engaging said blade to the lead 49 and the corresponding motor winding.

(2) When the blade 42 of the switch 36 is thrown by pneumatic pressure of the air in the pipe 16 to reverse position, the current passes from the main circuit 45 through the branch circuit 47 and switch blade 43 of the switch 37 to the conductor 53, thence through the switch arm 42 to the lead 50 of the corresponding motor winding.

(3) When both the switch arms 42 and 43 are thrown to reverse position by the pressure supplied through the air pipe 16, the current passes from the main circuit 45, through the branch conductor 48, switch arms 44, thence through the conductor 54, and switch arm 43 to the lead 51 of the corresponding motor winding.

(4) When the blade 44 is also thrown to reverse position by a further increase in air pressure in the pipe 16 the current then passes from the main circuit 45 and blade 44 to the lead 52 of the corresponding motor winding.

The arrangement is such that when in normal position, in the absence of actuating air pressure from the humidostat, current is supplied through the circuit 46 to the lead 41 of the motor by normal closure of the circuit 46, 49, thereby to maintain the normal speed of the motor at its maximum stage.

Upon reversal of the switch 36 responsive to rising actuating air pressure, the blade 42 is thrown to reverse position, thereby breaking the normal contact and establishing closure of the circuit 47 to supply current to the lead 50 of the motor, thereby reducing the speed of the motor to its second stage.

Responsive to further increase in actuating pressure supplied from the humidostat, the switch 37 is reversed, thereby breaking the contact between the blade 42 and its normal contact and establishing contact by the blade in reverse position to supply current through the lead 51 to the circuit 48 of the motor, thereby to reduce the speed of the motor to its third stage. Upon continued rise in actuating pressure due to further increase in humidity, the switch 38 is reversed, thereby causing the blade 44 to move from normal to reverse position, thereby breaking contact between the normal contact points and establishing contact through the reverse contact points, thus supplying current from the main circuit through the line 54 to the lead 52 of the motor and reducing the speed of the motor to the fourth or minimum stage.

It is obvious that upon progressive fall in actuating pressure responsive to falling humidity, the switches 38, 37, and 36, will be actuated in the reverse order named to be returned to their normal positions, thereby successively increasing the speed of the motor to its third, second and initial or normal stages and causing the progressive return of the motor to its normal and highest speed.

By virtue of this arrangement speed-controlling means for the fan is provided which includes a humidostat responsive to room conditions operable to correlate the volume of humidified air to predetermined standards of humidity by varying only the speed of the fan and which also serves to limit the speed of the fan to the minimum required to deliver conditioned air in volume sufficient to maintain the room humidity at a predetermined standard.

In addition to controlling the fan the humidity controller 14, which is responsive to conditions of the air in the room, also acts to control the supply of water from the pump 18 to the spray jets 23, and also to actuate the normally closed valve 28 which has alternative control of the steam supplied to the air heater 25.

This is accomplished through a pipe 55 of the pneumatic regulating system which leads from the pipe 16 to the normally open valve 21 which controls the supply of water to the spray jets and a branch pipe 56 which leads from the pipe 55 to a normally closed valve 57 which is located in a by-pass pipe 58 leading from the steam supply 27 to the heater.

The actuating adjustments of the controlling devices for the fan, for the spray supply and for the heater are such that humidity rising above the actuating setting of the humidity regulator 14 will operate as follows:

(1) Progressively to reduce the speed of the motor 32 and fan 9 to the preferred minimum speed, and thereafter:

(2) In response to increase in humidity to close the normally open valve 21 thereby discontinuing the supply of spray to the humidifier, and thereafter:

(3) In response to further rise in humidity progressively to open the normally closed valve 57, thereby progressively to increase the supply of steam to the air heater 25 for the purpose of reducing an abnormally high natural humidity by an increase in temperature.

It is evident that in response to humidity falling toward the actuating setting of the temperature regulator 13 the devices last named will be serially actuated conversely and in reverse order, thereby to prevent humidity from falling below the preferred value to which the setting of the thermostatic regulator is adjusted.

The outstanding characteristic of the method and apparatus of this invention as above disclosed is the accomplishment of control of humidity through progressive variation of the rate of circulation of the humidified supply of air in response to variation of air conditions within the room.

Fig. 3 is a diagrammatic illustration of a somewhat more refined embodiment of the invention. All of the elements of the apparatus illustrated and described in Fig. 1 are present also in Fig. 3 and are identified by the same numerals and symbols. The apparatus illustrated in Fig. 3 also includes a water heater which is located in the tank of the humidifier, a refrigerative cooler for the water which is supplied to the spray jets and automatic regulation therefor controlled conjointly by the temperature and humidity regulators of the room, and also automatic means controlled by the temperature regulator for controlling the damper motor to proportion the relative amounts of fresh and return air forming the air supply which is admitted to the humidifier.

The automatic controlling mechanism includes not only pneumatically operated valves of the character above described, but also certain relay valves which when normally open are designated as OR and when normally closed as CR.

The water heater 59, which may be of any suitable type, submerged in water in the tank of the humidifier 8, is supplied with steam through a pipe 60 which is connected to the pipe 26 leading from the source of steam supply 27.

Steam from the source 27 is supplied to the water heater 59 through steam pipe 26 and branch 60 in which is located a normally open diaphragm valve 61, and a normally closed diaphragm valve 63. Valve 61 is actuated to close only by actuating air pressure when supplied by the humidostat 14 (HR) responsive to rising humidity through pipes 16, 55, 56, and 62, with which valve 61 is operably connected. Valve 63 is actuated to open only when subject to air pressure supplied thereto from the source 11 through the pipe 64 with which it is operatively connected. In pipe 64 are located normally open relay valve 65 and normally closed relay valve 67. Relay valve 65 is actuated to close only by actuating air pressure when received responsive to rising temperature from the thermostat 13 through line 15 and branch 66 with which it is operatively connected. Relay valve 67 is maintained in open position only when operatively subjected to the pressure of water in the pipe line 68 which forms an extension of water pipe 20 beyond pneumatically-actuated valve 21.

Closure of valve 21 responsive to excessive humidity terminates the water pressure in line 68 and causes the closure of relay valve 67; relay valve 65 is open only during deficient temperature and valve 63 can therefore open only during deficient temperature and while the sprays are in operation. Therefore, since valve 61 is open only when actuated by deficient humidity, the admission of steam to water heater 59 through the serially-located valves 61 and 63 can occur only during a simultaneous deficiency of temperature and humidity and while the sprays are in operation.

Means are provided for artificially cooling the humidifier spray water comprising a refrigerative cooler 69 of any suitable type which is preferably located in a loop or by-pass 70 leading around a section of the spray water pipe 20. In this preferred construction a three-way diaphragm valve 71 is located at the junction of pipe 20 and by-pass 70 and is normally open for the direct passage of spray water from the pump 18 through pipe 20 to spray manifold 22. Valve 71 is operable by actuating air pressure in the pipe line 15 and 72 controlled by the thermostat 13 to variably divert spray water from the pipe 20 through the cooler 69 by way of the by-pass 70, and so back to pipe 20. The arrangement is such that the diverted and refrigeratively cooled spray water mingles with the undiverted spray water thereby cooling the spray water as a whole to a degree which varies in accordance with the position of three-way valve 71 as controlled by the thermostat 13.

A normally open relay valve 74 is located in line 55 branching from line 16 through which the humidostat 14 supplies variable actuating air pressure for the control of spray valve 21. Relay valve 74 is operable to be closed by actuating air pressure supplied by the thermostat 13 through lines 15, 72 and 73 leading to the diaphragm of relay valve 74.

Air pipe 72 is operatively connected with the damper motor 31 which is operable by air pressure controlled by the thermostat 13 and supplied through lines 15 and 72. A normally open relay valve 76 in line 72 is operable to interrupt operation of the damper motor 31 through closure of relay valve 76 responsive to air pressure in branch 75 from line 72 controlled by the thermostat 13.

By virtue of the construction above described the humidity regulator 14 is operatively connected through the pipe 16 and the branches thereof to supply actuating air pressure (1) to the switchboard panel 32; (2) to the normally open valve 21 which controls the water supplied to the pipes 22 and jets 23; (3) to the normally closed valve 57 which controls the supply of steam to the air heater 25; (4) to the normally open valve 61 which controls the supply of steam to the water heater 59.

The thermostat 13 (TR) is operatively connected for the supply of actuating air pressure:

(1) Through air pipe 15 to the normally open valve 28 located in line 26 for the control of the supply of steam from the source 27 to the air heater 25.

(2) Through air pipe 15 and branch 66 to the normally open relay valve 65 in the pipe 64 which ordinarily permits passage of air therethrough to maintain the normally closed valve 63 open for the passage of steam through pipe 60 to the water heater 59 provided that valve 61 in pipe 60 is also in its normal open position.

(3) Through air pipe 15, its extension 72 and normally open relay valve 76 to the damper motor 31 and through branch 75 from the branch air pipe 72 to the normally open relay valve 76 in branch 72, the arrangement being such that the damper motor is normally actuated by the thermostat 13 (TR) and subject to interruption of such actuation by relay valve 75.

(4) Through air pipe 15 and branches 72 and 73 to the normally open relay valve 74 in air pipe 55 which, as a branch of air pipe 16 operatively connects the humidostat 14 with normally open valve 21 for the purpose of controlling the supply of spray water to the sprays 23.

The several controlling devices above enumerated and identified are adjusted for actuation at predetermined and differing actuating pressures in an arrangement such that their several actuations will take place in predetermined serial order in response to progressive variation in the actuating pressure delivered from the temperature regulator 13 or the humidity regulator 14 as the case may be in an organization adapted to operate as follows:

In response to humidity progressively rising above the value at which the humidity regulator 14 is adjusted, progressively increasing actuating pressure will operate:

(1) Progressively to close the normally open valve 61, thereby to interrupt the supply of heat to the spray water and thereafter:

(2) To actuate in the manner above described in respect to Fig. 1 the selector switches mounted upon the panel 32 progressively to reduce the speed of the fan motor 33 to its predetermined minimum and thereafter:

(3) To actuate the normally open valve 21 to interrupt the flow of water supplied by the pump to the spray jets 23 and thereafter:

(4) To actuate the normally closed valve 57 to admit steam to the air heater 25.

It is to be noted that the third and fourth actuations in the series above described are only rarely necessary and are provided to meet special requirements that occasionally arise during relatively cool and humid nights where internal heat liberation in the room is relatively small. This provides for the reduction of humidity by raising the temperature only when interruption of humidification may sometimes fail sufficiently to reduce an excessive natural humidity.

In response to falling humidity within the room the humidity regulator 14 is operable conversely and in reverse serial order to cause:

(1) Progressive reduction of the supply of heat to the air heater 25 and thereafter:

(2) Progressively to increase the supply of water to the spray jets 23 and thereafter:

(3) Progressively to increase the speed of the fan motor 33 through a reverse actuation of the selector switches 38, 37 and 36 on the panel 32 and thereafter:

(4) Progressively to increase the supply of heat to the spray water through the normally open valve 61 subject however to the condition of the normally closed valve 63 in accordance with the existing room temperature.

The temperature regulator 13 and the several devices with which it is operatively connected, operate as follows: When and if the room temperature is deficient, heat will be supplied to the air heater 25 through the normally open valve 28.

The arrangement and actuation of the damper motor 31 is also such that the fresh air damper 6 is normally closed to its position of minimum opening and the return or recirculation air damper 7 under such circumstances is fully open during deficient temperature. The normally open relay valve 65 is also adjusted to be fully open under such circumstances, thus permitting the admission of steam to the water heater 59 through the normally closed valve 63, subject however to the condition of the normally open valve 61 which is controlled by the humidity regulator 14.

In response to temperature rising toward the desired actuating point, the thermostatic regulator 13 and its connecting devices are operable:

(1) Progressively to reduce the supply of heat to the air heater 25 by closing the normally open valve 28 and thereafter:

(2) To interrupt the supply of steam to the water heater 59 by effecting the closure of the normally open relay valve 65, thus causing the closure of the normally closed valve 63 and thereafter:

(3) To actuate the damper motor 31 progressively to open the fresh air damper 6 and correspondingly close the recirculating or return air damper 7 and thereafter:

(4) To close the normally open relay valve 74 in preparation for refrigerative cooling so as to prevent interruption of humidification during refrigerative cooling by preventing the closure of the normally open valve 21 and thereafter:

(5) To actuate the three-way valve 71 progressively to depart from its normal position in which water from the pump 18 passes directly to the spray jets 21, thereby to progressively divert an increasing portion of the water supplied by the pump through the by-pass pipe 70 and the cooler 69, and thence back to the pipe 20, and to the spray jets 23, thereby progressively to reduce the temperature of the water supplied by the pump to the spray jets 23.

Conversely in response to progressively falling temperature, the temperature regulator 13 and its connecting devices are operable:

(1) To cause the return of the three-way valve 71 to its normal position, thereby to cause discontinuance of refrigerative cooling and thereafter:

(2) To cause the normally open relay valve 74 to reopen so as to permit closure of the normally open valve 21.

(3) To cause the damper motor 31 progressively to return to its normal position, thereby progressively opening the return air damper 7 and correspondingly closing the fresh air damper 6 and thereafter:

(4) To cause the relay valve 65 to return to its normal open position, thereby opening the normally closed valve 63 to permit the resumption of the supply of steam to the water heater 59, conditional however upon the position of the normally open valve 61 in accordance with the room humidity condition and thereafter:

(5) To commence a progressively increasing supply of heat to the air heater 25 through the normally open valve 28.

It is to be particularly noted that the arrangement above described prevents heating of the spray water supply except in response to a simultaneous deficiency of both temperature and humidity. Also that the admission of fresh air in proportion greater than that corresponding to the minimum opening for which the fresh air damper is adjusted can only take place in response to continued rise in temperature following upon discontinuation of artificial heating such as will occur due to an excess of internal heat liberation within the room, or increased warm weather, or both. Also that an increase in fan speed to a rate higher than the predetermined minimum can only occur in response to falling humidity.

Thus if the system be first started from an inoperative condition at a time when the temperature and humidity are both deficient, the fan will operate at maximum speed, the humidifier will develop its full humidifying capacity, and the water heating means will operate at full capacity until temperature, or humidity, or both reach the desired level. Further, fan speed, humidification, and heating will be subject to instant reduction responsive to the attainment of the desired room conditions and will operate thereafter only at the minimum capacity necessary for maintaining the desired room conditions and therefore at maximum economy of power and without wasteful rejection of heat or moisture.

The actuating adjustment of the normally open valve 76 is or should be such that it will close only in response to continued increase in room temperature after the three-way valve 71 has diverted a considerable portion of the spray water supplied from the tank of the humidifier through the water cooler 69. Actuation of the relay valve 76 will cause reduction of ventilation by reversal of the compensating dampers 6 and 7.

If and when the heat content of the fresh air becomes such that the heat entering the room from this source exceeds the heat liberated within the room, it becomes desirable to reduce this excess of external heat by reducing ventilation and increasing recirculation, so as to conserve refrigerative capacity.

The actuating adjustment of the relay valve 76 should accordingly be made at the desired predetermined level of room temperature as determined by observation, and will thereafter operate to establish that desirable balance between ventilation and recirculation which represents the minimum load and power consumption of the refrigerating system that will most economically limit the rise in room temperature. It is to be noted in this connection that the provisions for refrigerative cooling, including the three-way valve 71, the water cooler 69, and its connections may be utilized as shown, or omitted when not required, and that the apparatus will in either case fall within the scope of my invention.

It is also evident that the apparatus as a whole, whether or not including refrigeration, provides for the conservation of both useful heat and moisture at all times; for the minimum consumption of power expended in producing circulation and humidification, and for the minimum consumption of fuel for artificial heating that is consistent with the room conditions desired.

When an ample supply of cold well water is available for refrigerative cooling, the use of mechanical refrigeration may be avoided by any desirable mechanical arrangement such as supplying said cold water under pressure to the suction line of the pump 18 under the control of a normally closed diaphragm valve actuated by the temperature regulator in the room in substantially the same manner as provided and shown in the case of the temperature control valve 71.

Another apparatus which is diagrammatically illustrated in Fig. 4 is adapted for the same performance of the method as that attained by the method and means illustrated in Fig. 3, but varies therefrom in that it embodies a dew point control.

The parts of the apparatus disclosed in Figs. 1 and 3, which are identical with corresponding parts of the apparatus illustrated in Fig. 4, are identified by like symbols.

In this embodiment of my invention the humidifier 8 is adapted to maintain the moistened air which is drawn into the fan and delivered therefrom to the room, in a condition of saturation. It is therefore convenient and preferable to regulate the dew point of the air delivered to the room R by means of a dew point thermostat 77 (which is marked DP) located within the structure of the humidifier and preferably subject to the temperature of the water collected on the surface of the eliminator 24.

The plates of the eliminator 24 are continuously flooded with spray water from a single row of spray jets which are projected from a manifold 78 which is supplied with water under pressure from the pump 18 through a branch pipe 79 leading from the pump 18 to the manifold 78. Thus continuous functioning of the dew point thermostat is insured during any period when the supply of water to the main spray jets 23 is interrupted.

The dew point thermostat 77 is supplied with air at constant pressure from the source 11 through the pipes 12 and 64 and a branch pipe 80 leading from the latter to the dew point thermostat 77. The dew point thermostat 77 delivers air at actuating pressure varying in accordance with variations in the dew point temperature through an air pipe 81 leading from the dew point thermostat to the three-way valve 71 which controls the diversion of part of the water to the cooler and thence to the sprays 23 during refrigeration and through branch air pipe lines 82, 83, and 84, respectively to the normally open valve 61 which controls the supply of steam to the water heater 59, to the normally open relay valve 74 in the air pressure line which leads from the humidity regulator to the valve 21 in the pipe which supplies water to the sprays 23 and the normally open relay valve 76 which controls the supply of actuating air pressure to the damper motor 31. These air pressure pipes in which the air pressure is regulated by the dew point thermostat are illustrated in dotted lines in order to distinguish them from the air pressure lines which lead from the temperature regulator and the humidity regulator respectively which are responsive to the air conditions within the room.

The inter-connections, locations and functions of the water cooler 69 and the three-way valve 71 for diversion of water thereto; the normally closed valve 63 and the normally open valve 61 in the steam pipe 60 which leads to the water heater 59; the normally open valve 28 and the normally closed valve 57 in the pipes 26 and 58 leading from the steam supply to the air heater 25; and the normally closed relay valve 67, are substantially the same as those illustrated and described in connection with Fig. 3.

The temperature regulator 13 and the humidity regulator 14, which are located within the room, are respectively supplied with air at constant pressure from the source 11 through the pipe 12, the normally closed valve 63 being also supplied with air for actuation at constant pressure from the source 11 through the pipe 64 which branches from the pipe 12. The normally open valve 28 is actuated by the temperature regulator through the pipe 15. The humidity regulator actuates respectively through the pipe 16, (1) the selector switches 36, 37, and 38, on the panel 32, which control the speed of the fan motor 33; (2) through the branch pipe 55, the normally open valve 21 which controls the supply of water from the pump 18 to the spray jets 23, and (3) through the branch pipe 56, the normally closed valve 57 in the by-pass pipe 58 leading from the steam supply to the air heater 25.

The actuating range of the dew point thermostat 77 and the adjustment of the several actuating devices controlled thereby are adapted to maintain the dew point of the saturated air and therefore of the air delivered to the room within that range lying between the maximum and minimum values of the dew point corresponding to the predetermined standard of room conditions as hereinbefore defined.

The temperature regulator 13 is operable in response to deficient room temperature to maintain the supply of heat to the air heater 25 through the normally open valve 28 and conversely to reduce said supply of heat responsive to temperature rising toward the preferred minimum room temperature.

The humidity regulator 14 is operable responsive to humidity rising toward the preferred room conditions as follows:

(1) Progressively to reduce the speed of the fan motor 33 to its predetermined minimum and thereafter:

(2) To reduce the supply of spray water delivered by the pump 18 to the spray jets 23 by closure of the normally open valve 21 and thereafter:

(3) To supply heat to the air heater 25 through the normally closed valve 57 in the rarely encountered condition of excessive humidity at normal temperature.

In response to humidity falling toward the preferred room condition, it is evident that the converse of the actuations last described will take place in reverse order.

In response to dew point rising toward the preferred minimum limit, the dew point thermostat and its controlled devices are operable as follows:

(1) To interrupt the supply of steam to the water heater 59 through the normally open valve 61 and thereafter:

(2) To actuate the damper motor 31 progressively to increase ventilation by opening the fresh air damper 6 and conjointly closing the recirculation or return air damper 7 and thereafter:

(3) To close the normally open relay valve 74 thereby to prevent closure of the normally open valve 21 by actuation of the humidity regulator during refrigerative operation and thereafter:

(4) To commence and progressively increase refrigerative cooling by actuating the three-way valve 71 progressively to divert water supplied by the pipe 20 to the spray jets through the water cooler 69 and, subsequent to the attainment of the preferred maximum refrigeration:

(5) To actuate the normally open relay valve 76 to cause the differential dampers 6 and 7 to return toward their normal positions thereby to reduce ventilation and correspondingly to reduce that component of the refrigerative load originating in excessive heat content of the fresh air and consequent admission of heat to the system by excessive ventilation.

In response to weather changing from excessive warmth to moderate or cool conditions, it is evident that the actuations last described will take place conversely and in the reverse order.

It will be evident that the arrangement is such that the dew point control operates to control within relatively close limits the variations in the moisture content of the air entering the room, thereby similarly limiting variations in that component of heat contained in the conditioned air that is due to the latent heat of said moisture content, an arrangement which necessarily reduces those variations in room temperature and room humidity that must be corrected by the humidity regulator 14 and the thermostatic regulator 13.

The arrangement above described is therefore especially adapted for use under conditions where comfort of the occupants of the room is an important consideration, since variations in these conditions may thus be controlled within any preferred degree of tolerance.

The system illustrated and described in respect to Fig. 4 will operate in general as follows:

If started when room humidity, room temperature and dew point are all deficient, as in cold weather, the temperature regulator 13 will cause steam to supply heat through the air heater 25. The dew point thermostat will cause heat to be supplied to the water in the tank of the humidifier through the open valve 61 until the dew point rises to the minimum limit of its preferred range, with ventilation meanwhile limited to its minimum value, with maximum recirculation of room air, and with the fan maintaining maximum circulation until checked by the humidity regulator in response to the attainment of the predetermined standard of humidity.

Rising room temperature will first cause the thermostatic regulator to interrupt the supply of artificial heat thereby establishing control of dew point, humidity and temperature. As the weather becomes warmer, further rise in room temperature at the preferred standard of humidity will cause a corresponding rise in dew point, indicating the relative need for rejection of superfluous heat from the room, responsive to which condition the dew point thermostat will increase ventilation through actuation of the damper motor 31, to increase the supply of fresh air through the damper 6 and correspondingly diminish the supply of return or recirculated air through the damper 7.

Meanwhile the increasing demand for moisture to maintain the predetermined standard of room humidity will result in increased fan speed and will correspondingly increase evaporative cooling under the control of the humidity regulator until desirable ventilation and maximum evaporative cooling are both attained. Any further increase in room temperature in the presence of adequate humidity will further increase the dew point until refrigerative cooling becomes operative at the predetermined standard of actuation of the dew point control. The continued rise in dew point temperature will increase refrigerative cooling up to that preferred standard of dew point temperature at which the reversal of the fresh air and return air dampers occur for the purpose of conserving refrigerative capacity as heretofore explained.

It will be evident that the provisions for refrigeration may be included in or omitted from the equipment in accordance with local requirements, and that in either case the method and means employed will fall within the scope of the invention defined by the following claims.

It will be understood that the method and apparatus disclosed are capable of such modification in detail as will meet a wide variety of requirements including the simultaneous conditioning of a multiplicity of rooms within the contemplated scope of the invention as defined by the claims.

Having thus described the invention, what is claimed as new, and desired to be secured by Letters Patent, is:

1. Apparatus for ventilating and humidifying a room comprising a humidifier, air circulating means for delivering air to the room from said humidifier, including a fan driven by a variable speed motor, means for controlling the supply of moisture for humidifying said air, a humidostat exposed to room conditions and means operable by said humidostat to controllably vary the speed of said fan and the volume of air circulated thereby and alternatively to control said supply of moisture to maintain a predetermined standard of humidity within said room.

2. Apparatus for ventilating and humidifying a room comprising a humidifier, air circulating means for delivering air to the room from said humidifier including a fan driven by a variable speed motor, means for controlling the supply of moisture for humidifying said air, a humidostat exposed to room conditions and means operable alternatively thereby to control said supply of moisture and to variably control the speed of the fan and the volume of the air circulated thereby to the minimum required to maintain a predetermined standard of humidity within said room.

3. Apparatus for humidifying and heating a room by a predetermined standard of humidity and temperature comprising a humidifier adapted to saturate a supply of air, ventilating apparatus including a power-driven fan for renewing room air with said saturated air and air-proportioning means for supplying a mixture of fresh air and air withdrawn from the room to the humidifier in controllable proportions, means for controlling the speed of said fan, means for heating said saturated air, regulating means including a humidostat and a thermostat responsive to room conditions, said humidostat actuating said speed-controlling means to limit the volume of said saturated air to the minimum effective to maintain room humidity in accordance with said standard by varying only the speed of said fan, said humidostat and thermostat acting conjointly to limit the action of said heating means to the minimum effective to maintain room temperature in accordance with said standard, and supplemental thermostatic means responsive to the dew point temperature of said saturated air operable to regulate the dew point thereof in accordance with said predetermined standard by correlating the proportion of fresh air in the mixture to variations in the dew point.

4. Apparatus for conditioning a room to a predetermined standard of temperature and humidity comprising a humidifier for saturating a supply of air and a supply of spray water therefor, ventilating apparatus including a power-driven fan operable at variable speed to renew the room air with said saturated air and air-proportioning dampers for supplying the humidifier with a controllably-proportioned mixture of fresh air and air withdrawn from the room, separate means for selectively heating said humidified air and said spray water, regulating means operable responsive to room conditions to maintain the same at said predetermined standard (1) by restricting said spray water supply only responsive to excessive humidity, (2) by limiting the speed of said fan and the volume of said saturated air to the minimum effective to maintain room humidity in accordance with said standard, (3) by actuating said air-heating means responsive only to deficient room temperature, and supplemental thermostatic means operable responsive to the dew point temperature of said saturated air to regulate the same in accordance with said predetermined standard by actuating said water-heating means only responsive to deficient dew point, and by varying the proportion of fresh air in said mixture in correlation to variation in the dew point.

5. Apparatus for humidifying and cooling the air of a room to a predetermined standard of humidity comprising a humidifier adapted to saturate a supply of air, a supply of spray water for said humidifier, ventilating apparatus including a fan operable at variable speed to renew the room air with said saturated air supply and air-proportioning dampers for supplying to the humidifier a variably proportioned mixture of fresh air and air withdrawn from the room, means for refrigeratively cooling said spray water, regulating means operable responsive to room conditions to maintain humidity in accordance with said standard (1) by limiting the speed of said fan and the resultant supply of saturated air to the minimum effective to maintain humidity within said standard, and (2) by limiting said spray water responsive only to excessive humidity, and supplemental thermostatic means operable responsive to the dew point of said saturated air to regulate the dew point thereof in accordance with said predetermined standard by correlating the proportion of fresh air in said mixture to variations in the dew point of said saturated air when within said standard, by refrigeratively cooling said spray water in correlation to the dew point of said saturated air when approaching the upper limit of said standard and by limiting the proportion of fresh air in said mixture responsive to the dew point of said saturated air only when reaching the upper limit of said standard.

6. Apparatus for conditioning the air of a room to a predetermined standard of atmospheric conditions comprising a humidifier supplied with spray water operable to saturate a supply of air, ventilating apparatus including a power-driven fan operable at variable speed to renew the room air with said supply of saturated air and air-proportioning dampers operable to vary the relative proportions of fresh air and air withdrawn from the room for saturation, separate means for heating said saturated air, means for heating said spray water, and means for refrigeratively cooling the spray water, regulating means operable responsive to room conditions to maintain humidity in accordance with said standard (1) by limiting the supply of said spray water only during excessive humidity, (2) by limiting the speed of said fan and the volume of said saturated air to the minimum effective to maintain humidity within said standard, and (3) by activating said air-heating means only during room temperature in deficiency of said standard, and supplemental thermostatic means operable responsive to the dew point of said saturated air to regulate the dew point thereof in accordance with said predetermined standard by activating said water-heating means responsive only to deficient dew point, by correlating the proportion of fresh air in said supply to the dew point of said saturated air when within said standard, by refrigeratively cooling said spray water in correlation to variations in the dew point only when approaching the upper limit of said standard, and by limiting the proportion of fresh air in said supply responsive to the dew point of said saturated air only upon reaching said upper limit of said standard.

7. Apparatus for ventilating and humidifying a room comprising a humidifier, air circulating means for delivering air to the room from said humidifier, including a fan driven by a variable speed motor, a humidostat exposed to room conditions and acting responsive to rising humidity to reduce humidification by progressively reducing the energy supplied to the fan motor to vary its speed and the corresponding volume of air circulated from a predetermined maximum to a predetermined minimum in the first instance and thereafter to interrupt the action of said humidifier and acting conversely in response to falling humidity.

8. Apparatus for conditioning the air of a room including power operated air circulating means including a variable speed motor for delivering continuously an unobstructed supply of conditioned air to the room, a humidifier for moistening said supply of air, means directly controlling the supply of energy operating said air circulating means including a humidostat acting responsive to room humidity variably to limit said supply of energy to the minimum effective to circulate said humidified air in volume effective to maintain a predetermined standard of humidity within the room.

9. Apparatus for conditioning the air of a room comprising a humidifier for conditioning a current of air, having means for projecting spray water into the air passing therethrough, a variable speed motor driven fan for circulating air through said humidifier into the room, a humidostat within said room responsive to the humidity therein, means normally operable thereby variably to limit the energy supplied to the fan motor to the minimum necessary to drive the fan at such speed as will supply humidified air to the room in volume effective to maintain a predetermined standard of humidity therein.

10. Apparatus for conditioning the air of a room comprising air circulating means including a fan driven by a variable speed motor for supplying conditioned air to the room, a humidifier provided with water spraying means for conditioning said air supply with moisture and automatic energy regulating means for controllably varying the speed of the fan motor in accordance with the energy supplied thereto including a humidostat acting upon said energy regulating means responsive to room humidity to limit the supply of energy to said motor to the minimum necessary to drive the fan at such speed as is effective to supply he room with conditioned air in volume effective to maintain a predetermined standard of humidity therein.

11. Apparatus for conditioning the air of a room comprising air circulating means including a fan driven by a variable speed motor for supplying conditioned air to the room, a humidifier provided with water spraying means for conditioning said air supply with moisture and energy regulating means for controllably varying the speed of the fan motor in accordance with the energy supplied thereto including a humidostat acting upon said energy regulating means responsive to room humidity to limit the supply of energy to said motor to the minimum necessary to drive the fan at such speed as is effective to cause said fan to supply the room with conditioned air in volume effective to maintain a predetermined standard of humidity therein, and spray regulating means actuated by said humidostat only in response to humidity exceeding said predetermined standard to interrupt the operation of said water spraying means.

12. Apparatus for conditioning the air of a room comprising air circulating means including a fan driven by a variable speed motor for supplying conditioned air to the room, a humidifier provided with water spraying means for conditioning said air supply with moisture and energy regulating means for controllably varying the speed of said fan motor in accordance with the energy supplied thereto, means for heating said moistened air, a humidostat responsive to room condition acting upon said energy regulating means to limit the supply of energy to said motor to the minimum effective to cause said fan to supply the room with conditioned air in volume effective to maintain humidity at a predetermined standard, said humidostat also acting selectively upon said water spraying means to discontinue said spray only upon humidity reaching the upper limit of said standard and upon said heating means to actuate the same only upon humidity exceeding said upper limit of said standard.

13. Apparatus for conditioning the air of a room comprising air circulating means including a fan driven by a variable speed motor for supplying conditioned air to the room, a humidifier provided with water spraying means for conditioning said air supply with moisture and energy regulating means for controllably varying the speed of said fan motor in accordance with the energy supplied thereto, means for heating said moistened air, a humidostat responsive to room conditions acting upon said energy regulating means to limit the energy supplied to said fan motor to the minimum effective to circulate said conditioned air in volume effective to maintain a predetermined standard of humidity, a thermostat responsive to room conditions and means operable by said thermostat to interrupt the action of said heating means in response to temperature exceeding a predetermined minimum limit of room temperature, and air proportioning means for providing a mixture of fresh air and air withdrawn from the room in controllable proportions for conditioning and actuated by said thermostat upon temperature rising above said predetermined minimum to limit the proportion of withdrawn air to the minimum effective to preserve said predetermined minimum temperature thereby to conserve useful heat.

14. Apparatus for conditioning the air of a room comprising a humidifier for conditioning a current of air having means for projecting a water spray into said air current while passing therethrough, separate means selectively operable to heat or to cool the spray water, means for heating the humidified air leaving the humidifier, a fan driven by a variable speed motor for circulating air through the humidifier into the room, means for supplying a mixture of fresh air and air withdrawn from the room to the humidifier in controllable proportions, a humidostat responsive to room humidity, means operable thereby variably to limit the energy supplied to the fan motor to the minimum effective to drive the fan at such speed as to supply humidified air to the room in volume effective to maintain a predetermined standard of humidity within the room, a thermostat subject to the room temperature, means operable by said thermostat to limit the action of said air heating means to the minimum effective to maintain room temperature at a predetermined minimum limit, means operated by said thermostat for actuating said air proportioning means responsive to room temperature rising above said predetermined minimum limit to restrict the proportion of withdrawn air in said mixture to the minimum effective to maintain said minimum temperature limit and means operable by the conjoint action of said humidostat and said thermostat to actuate said water heating means responsive only to simultaneous deficiency in humidity and temperature thereby to maintain a predetermined standard of humidity and temperature with the minimum consumption of power and heat and to reject objectionable surplus of heat when present.

15. Apparatus for conditioning the air of a room to a predetermined standard of temperature and humidity comprising a humidifier having means for projecting a spray of water into a supply of air while passing therethrough, a fan driven by a variable speed motor constructed and arranged to circulate a continuous supply of air through said humidifier and thence into the room for renewal of the air therein, separate means operable selectively to heat or to cool said spray water, means for heating the air supply leaving the humidifier, air proportioning means for supplying to the humidifier a mixture of fresh air and air withdrawn from the room in controllable proportions, humidity regulating means including a humidostat responsive to room humidity, energy controlling means operable thereby to variably limit the energy supplied to said fan motor to the minimum effective to operate the fan at speed sufficient to maintain said standard of humidity by supplying an adequate volume of said conditioned air, spray controlling means actuated by said humidostat to interrupt said spray responsive only to rising humidity approaching the upper limit of said standard, and to actuate said air heating means responsive to humidity exceeding said standard, temperature regulating means including a thermostat responsive to room temperature, means operable by the conjoint action of said thermostat and said humidostat to activate said water heating means only in response to humidity and temperature in simultaneous deficiency of said standard, means respectively operable by said thermostat (1) to activate said air heating means responsive to room temperature falling below said standard, (2) to actuate said air proportioning means to variably limit the proportion of withdrawn air in said mixture in accordance with room temperature when rising from the lower toward the upper limit of said standard, and (3) to actuate said water cooling means to variably cool said spray water responsive only to temperature rising to the upper limit of said standard.

16. The method of ventilating and humidifying a room which includes employing energy to circulate freely therein a continuous supply of air for renewal of the room air, adding moisture thereto by evaporation of water therein and regulating the volume of said air circulated by varying only the energy supplied for circulating said air in accordance with the room conditions to regulate the humidity.

17. The method of ventilating and humidifying a room which includes employing energy to circulate freely therein a continuous supply of air for renewal of the room air, adding moisture thereto by evaporation of water therein and responsive to air conditions within the room limiting the energy supplied for circulation to the minimum effective to circulate said moistened air in volume sufficient to raise the room humidity to a predetermined standard.

18. The method of humidifying and heating the air of a room to a predetermined standard of humidity and temperature which includes employing energy to circulate freely therein a continuous supply of air moistened by the evaporation of water spray for the renewal of the room air and responsive to room conditions, maintaining the energy supplied for circulation of said air at the minimum rate effective to circulate said moistened air in volume sufficient to maintain said standard of humidity by reducing the supply of energy only in response to humidity rising above said standard and heating said moistened air only upon room temperature falling below said standard.

ALFRED F. KARLSON.